(12) United States Patent
Mangum (10) Patent No.: US 8,910,738 B2
(45) Date of Patent: Dec. 16, 2014

(54) SNOW BIKE CONVERSION SYSTEM (76) Inventor: Allen Mangum, Kootenai, ID (US)

(*) Notice: Subject to any disclaimer, the term of this patent is extended or adjusted under 35 U.S.C. 154(b) by 0 days.

(21) Appl. No.: 13/038,362

(22) Filed: Mar. 1, 2011

(65) Prior Publication Data

US 2012/0222908 A1 Sep. 6, 2012

(51) Int. Cl.
*B62D 55/04* (2006.01)
*B62D 55/07* (2006.01)
*B62D 55/112* (2006.01)
*B62M 27/02* (2006.01)

(52) U.S. Cl.
CPC .............. *B62D 55/04* (2013.01); *B62D 55/07* (2013.01); *B62D 55/112* (2013.01); *B62M 2027/022* (2013.01); *B62M 27/02* (2013.01)
USPC ........................... 180/193; 180/9.26; 180/190

(58) Field of Classification Search
CPC ...... B62D 55/07; B62D 55/04; B62D 55/112; B62M 2027/022; B62M 27/02
USPC ........ 180/193, 190, 9.56, 9.5; 305/16, 24, 17, 305/29, 31
See application file for complete search history.

(56) References Cited

U.S. PATENT DOCUMENTS

| | | | | |
|---|---|---|---|---|
| 3,822,755 A * | 7/1974 | Hine | | 180/185 |
| 5,370,198 A * | 12/1994 | Karpik | | 180/193 |
| 5,586,614 A * | 12/1996 | Kouchi et al. | | 180/190 |
| 6,431,301 B1 * | 8/2002 | Forbes | | 180/185 |
| 7,475,751 B2 * | 1/2009 | Pard et al. | | 180/190 |
| 2004/0195024 A1 * | 10/2004 | Takahiko et al. | | 180/193 |

* cited by examiner

*Primary Examiner* — Joseph M Rocca
*Assistant Examiner* — Jacob Knutson
(74) *Attorney, Agent, or Firm* — Kunzler Law Group

(57) ABSTRACT

A snow bike system includes a motorcycle converted for use in the snow with a rear suspension and belt track system. The belt track is relatively very wide and driven by a front wheel sprocket through a jackshaft. Matching shocks and struts in the rear suspension independently equalize the pressure applied to the ground. The rear strut is a sliding extension type that causes the front of the sliders to kick up when fully compressed during acceleration or climbing uphill. Increased weight on the rear track is shifted forward to keep the front ski down. The jackshaft provides both disc braking and moves the motorcycle engine drive power outboard to accommodate the wider belt track. A tubular subframe and tunnel rigidly mounts to the motorcycle's original rear swing arm pivots and shock mounts.

21 Claims, 5 Drawing Sheets

SNOW BIKE CONVERSION SYSTEM

BACKGROUND OF THE INVENTION

1. Field of the Invention

The present invention generally relates to snow vehicles, and in particular to devices and methods for converting motorcycles to high performance snow bikes and snow motorcycles.

2. Description of the Prior Art

Ford Model-T automobiles and even older types were long ago converted for use in winter snows by bolting drive tracks and skis where the wheels were originally. More recently, a number of people and companies have offered components, kits, and whole assemblies to convert ordinary dirt bikes and light motorcycles for winter use as snow bikes. Some of these are easily reversible, and the skis and drive tracks can be removed and the original wheels reinstalled for summer use.

For example, Vernal Forbes describes a snow vehicle in U.S. Pat. No. 6,626,258, issued Sep. 30, 2003, that tries to emulate the steering and balancing characteristics of motorcycles and bicycles. Conventional snowmobiles were described as being too heavy, 400-600 pounds, and limited to flat operation because of their outrigger positioning of the front skis and wide flat rear drive tracks. As such, these kinds of snowmobiles cannot be operated diagonally on steep slopes that require the rider to lean the vehicle in to the hillside.

Kits for converting light motorcycles and dirt bikes into track-driven snow vehicles make use of road vehicles that would otherwise lay idle during the winter snows. Tim Jordan describes such a kit in U.S. Pat. No. 7,357,201, issued Apr. 15, 2008. Once converted, a motorcycle or bike can be operated on mud, sand, or snow, and then converted back for use on the roads. The tracked version is powered by the original vehicle driven system, and uses the original braking and suspension system.

What is needed is a snow bike system that provides excellent performance and agility in the snow and especially diagonally on steep slopes. There should not be a substantial difference in the balance and way the vehicle handles in the summer with wheels and how it balances and handles in the snow with skis and drive tracks. The same rider should be immediately comfortable either way.

SUMMARY OF THE INVENTION

Briefly, a snow bike system embodiment of the present invention includes a motorcycle converted for use in the snow with a rear suspension and belt track system. The belt track is relatively very wide and driven by a front wheel sprocket through a sealed jackshaft assembly. Fore and aft shocks in the rear suspension are critically associated with struts to independently equalize the pressure applied by the front and back segments of the drive track to the ground. The rear strut is a sliding extension type that causes the front of the sliders to kick up when fully compressed. During acceleration or climbing uphill, some of the increased weight on the rear track is shifted forward to keep the front ski down and to better maintain steering. An intermediate jackshaft provides both disc braking and moves the motorcycle engine drive power outboard to accommodate a wider belt track. A tubular subframe rigidly mounts to the original rear swing arm and shock mounts on the motorcycle. A tunnel bolts up under the tubular subframe and provides cover for the top of the belt track and mounting points for the tops of the shocks and struts.

These and other objects and advantages of the present invention will no doubt become obvious to those of ordinary skill in the art after having read the following detailed description of the preferred embodiments that are illustrated in the various drawing figures.

DETAILED DESCRIPTION OF THE PREFERRED EMBODIMENTS

Figure 1:
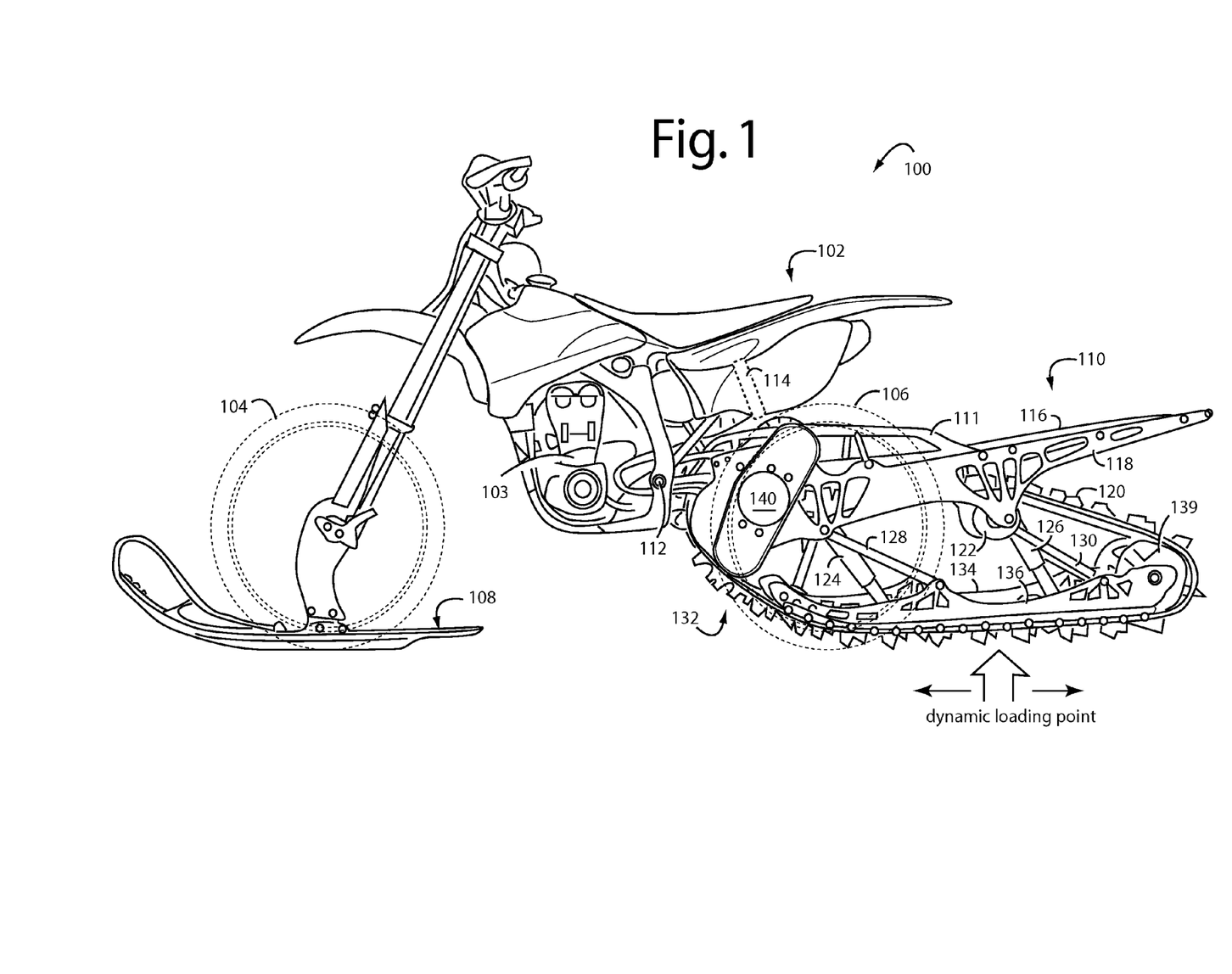
FIG. 1 is a left side view diagram of a snow bike system embodiment of the present invention showing how a front ski and a rear suspension and track drive have been substituted for the front and rear wheels and swing arm suspension.

FIG. 1 represents a snow bike system embodiment of the present invention, and is referred to herein by the general reference numeral 100. The snow bike system 100 comprises, for example, a dirt bike 102 with an engine 103 which has had its front wheel 104 and rear wheel 106 and rear swing-arm suspension removed. A single front steering ski 108 and a bolt-on rear track drive assembly 110 are shown installed for winter use in the snow. For example, a Simmons dual-keel flexi-ski can be used for front steering ski 108.

The rear track drive assembly 110 has a tubular subframe 111 that attaches to dirt bike 102 with a rear swing arm pin 112 and a solid strut 114 that replaces the original shock. The top part of rear track drive assembly 110 is thus rigidly attached and does not move during use. A tunnel assembly 116 attaches to both sides of the tubular subframe 111 with tunnel side skirts 118 and provides protective cover for the top of a drive track 120 and mounting for a track roller 122, forward and aft adjustable shocks 124 and 126, and forward and aft track struts 128 and 130. Track 120, for example, can comprise a Camoplast Challenger Track, 121" long, 12¼" wide, 1¾" deep lug. The length of rear track strut 130 is adjustable, e.g., with a combination of shims.

The forward and aft shocks 124 and 126, and the forward and aft track struts 128 and 130 together support a so-called hyfax slide suspension 132. A hyfax is a sacrificial plastic glide which runs the length of two parallel rear suspension rails 134 and 136 on both sides. Polystyrene and graphite glide materials can be used because they provide very smooth contact surfaces to track 120 and low operational friction especially when lubricated with snow. Ice scratchers can be temporarily attached by the user to the rear suspension rails 134 and 136 on both sides so that scratched ice will lubricate the hyfax when running long distances on hard frozen trails with no loose snow.

An adjustable limit strap 138 controls the initial upward tilt of the hyfax slide assembly 132 to the ground and snow underneath. Limiter strap 138 typically has ten adjustment holes in the middle of the strap. Shortening the strap will increase pressure on the front ski 108 and will provide more steering control on steep slopes. Lengthening the straps will lighten the front ski pressure and will allow more front ski lift when climbing up grades.

Increases in upward tilt will shift the center-point of support toward the rear, making the center of gravity of the whole relatively closer to the front ski 108. The adjustable limit strap 138 determines how far away forward shock 124 can push down the leading edge of the hyfax slide assembly 132. The front leading edge of the hyfax slide suspension 132 is also turned up to provide an approach angle of about twenty-degrees.

During acceleration and increased loading, the leverage and geometry of the adjustable shock and strut combination is such that center-point of track 120 that is supporting the backend weight of snow bike system 100 will dynamically shift further back. The front of snow bike system 100 will have to take more of the static weight as a result, and the increased static weight will keep the front ski 108 down on the ground and better maintain steering. Such is represented in FIG. 1 by the "dynamic loading point" arrow which can shift forward or back. A rear track roller 139 is mounted to the rear end of hyfax slide suspension 132. A jackshaft 140 in a sealed case couples the engine power on a chain and sprocket to a more outboard position where it can power a forward track roller and track drive wheel (covered by tunnel 118 and not shown in FIG. 1) inside the front loop of track 120.

An auxiliary air pump can be used to adjust the spring rate of the adjustable shocks 124 and 126. A starting air pressure, for example, of seventy pounds per square inch (70 psi) is used. The air pressure is best adjusted in increments of 10-psi at a time. Conventional shocks can be operated in a range of 40-150 psi. If the suspension bottoms out during normal use, the air pressure is too low and can be increased by the user.

The length of rear strut 130 can be adjusted in the shop, e.g., by changing the number of shim washers installed. The degree coupling of the back suspension and the amount of lift that will develop on front ski 108 when climbing a hill can be changed by adjusting the length of rear strut 130. Such adjustment also affects how independent the front and back portions of the hyfax suspension 132 will be from one another, as well as the rear ride height of bike 102.

The geometric relationship of the front and rear adjustable shocks 124 and 126 with their associated front and rear struts 128 and 130 balances the pressures applied to the snow between the front and back halves of the track under the hyfax slide suspension 132. In one embodiment, about 13" of vertical travel was provided. The track angle changes along the suspension travel. As the hyfax slide assembly 132 is compressed by loads up further into the tunnel assembly and the track 120 is flattened, the suspension will travel straight up into the tunnel, increasing the track angle, and apply the systems weight toward the front, pulling it on top of the snow.

Referring again to FIG. 1, a drive system jackshaft 140 puts the drive more outboard to accommodate the wide width of track 120.

In general, snow bike system embodiments of the present invention start with a previously manufactured motorcycle 102 with engine 103. Its front wheel 104, rear wheel 106, and swing arm suspension are removed. A single steering ski assembly 108 is installed in the place of the front wheel to provide for steering. A rear track drive assembly 132 is installed in the place of the rear wheel and swing arm suspension and drives for acceleration and braking. It has track slides 134, 136 and a track belt 120 connected to be driven by engine 103 between forward belt roller and a rear belt roller 139 suspended with and positioned fore and aft of the track slides 134, 136.

Embodiments of the present invention are in particular characterized by a rigid mounting of the rear track drive assembly 110 to the motorcycle, including a tubular frame 111 and providing for a solid strut 114 connection and a swing arm pivot 112 connection to the motorcycle 102.

Figure 2:
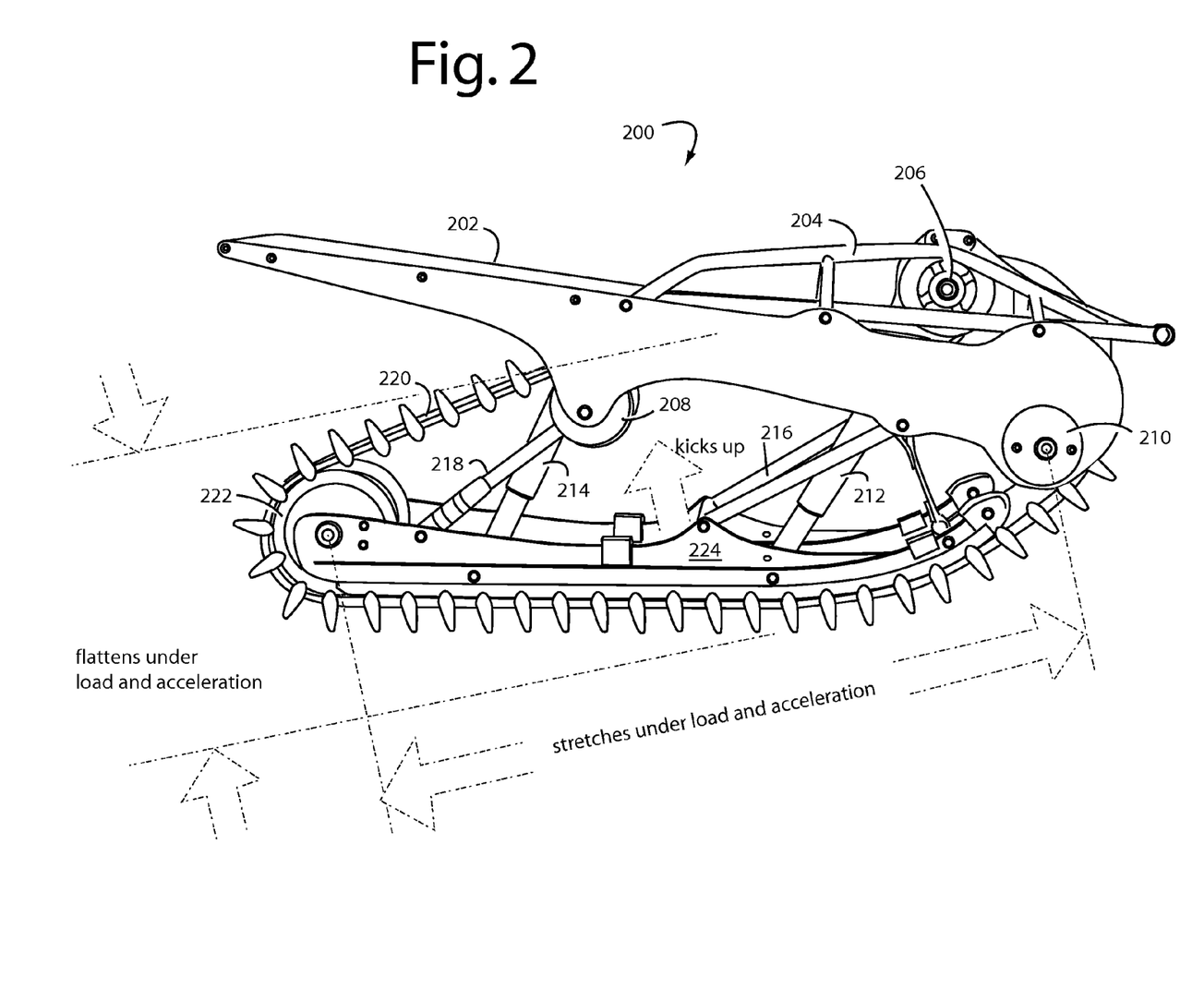
FIG. 2 is a perspective view diagram from the right side of a complete rear assembly for converting a motorcycle to a snow bike and that includes a track tunnel rigidly attached to the underside of a tubular frame.

Referring now to FIG. 2, a complete rear assembly 200 for converting a motorcycle to a snow bike includes a track tunnel 202 rigidly attached to the underside of a tubular frame 204. Track tunnel 202 has opposite side skirts that provide for the rigid, not-suspended mounting of a jackshaft 206, top track roller 208, a front track roller and drive sprocket 210, forward and rear gas shocks 212 and 214, and forward and rear struts 216 and 218.

Jackshaft 206 is in a sealed case and is mounted to the track tunnel 202 such that the transmission of power can be carried from the engine 103 (FIG. 1) to a track belt 220 through the front track roller and drive sprocket 210. Conventional designs do not drive the front track roller and instead include a long transmission and driveshaft mechanisms to drive one of the aft rollers. Jackshaft 206 includes a disc brake and caliper operated by a right-hand handlebar-mounted hydraulic master cylinder on the motorcycle 102.

The suspension system is such that the track belt 220 collapses flat and the separation distance increases between the front track roller and drive sprocket 210 and a rear belt roller 222 as trail impacts and weight load changes are absorbed. The arcing movement of front strut 216 is especially responsible for this behavior. The suspension system is further configured by the placement of rear strut 218 such that the front of a hyfax slide assembly 224 will be forcefully cantilevered or kicked up relative to the rear belt roller 222 at particular points of the track belt collapse.

The front gas shock 212 and front strut 216 are strategically disposed in the front half of the suspension system and track drive assembly 200 to control the response of the front portion of the track slide 224 to loads and acceleration. The rear gas shock 214 and rear strut 218 are disposed in the aft half of the suspension system and track drive assembly 200 to control the response of the rear belt roller 222 and back portion of the track slide 224 to loads and acceleration.

A back arm slide mechanism included in the rear strut 218 permits the length of the rear strut to slip between minimum and maximum limits of extension. It is connected within the suspension system such that when strut 218 is forced to its minimum length of extension, the front portion of track slide 224 is kicked and cantilevered up relative to the rear belt roller 222 and back portion of the track slide 224. Such kick increases the angle of attack. The rear strut is preferably configured to slip between adjustable minimum and maximum limits of extension, e.g., with the use of removable shims the user can manipulate.

The drive system is such that a first drive chain (not shown) is provided from engine 103 (FIG. 1) to the jack shaft 206 inside tunnel 202. The jack shaft transfers engine driving power to the outside left of tunnel 202. A secondary chain (not shown) drives from jack shaft 206 to front track roller and drive sprocket 210 such that the system drives off the front of the track 220. Chain tensioners are included on both drive chains to accommodate different sprocket gearing options.

The secondary chain drive system is sealed inside a chain case. A typical drive system uses O-ring chains, 4140 Chrome-Moly steel axles, CNC machined drive sprockets and bearing cages, and over-sized sealed axle bearings.

Figure 3:
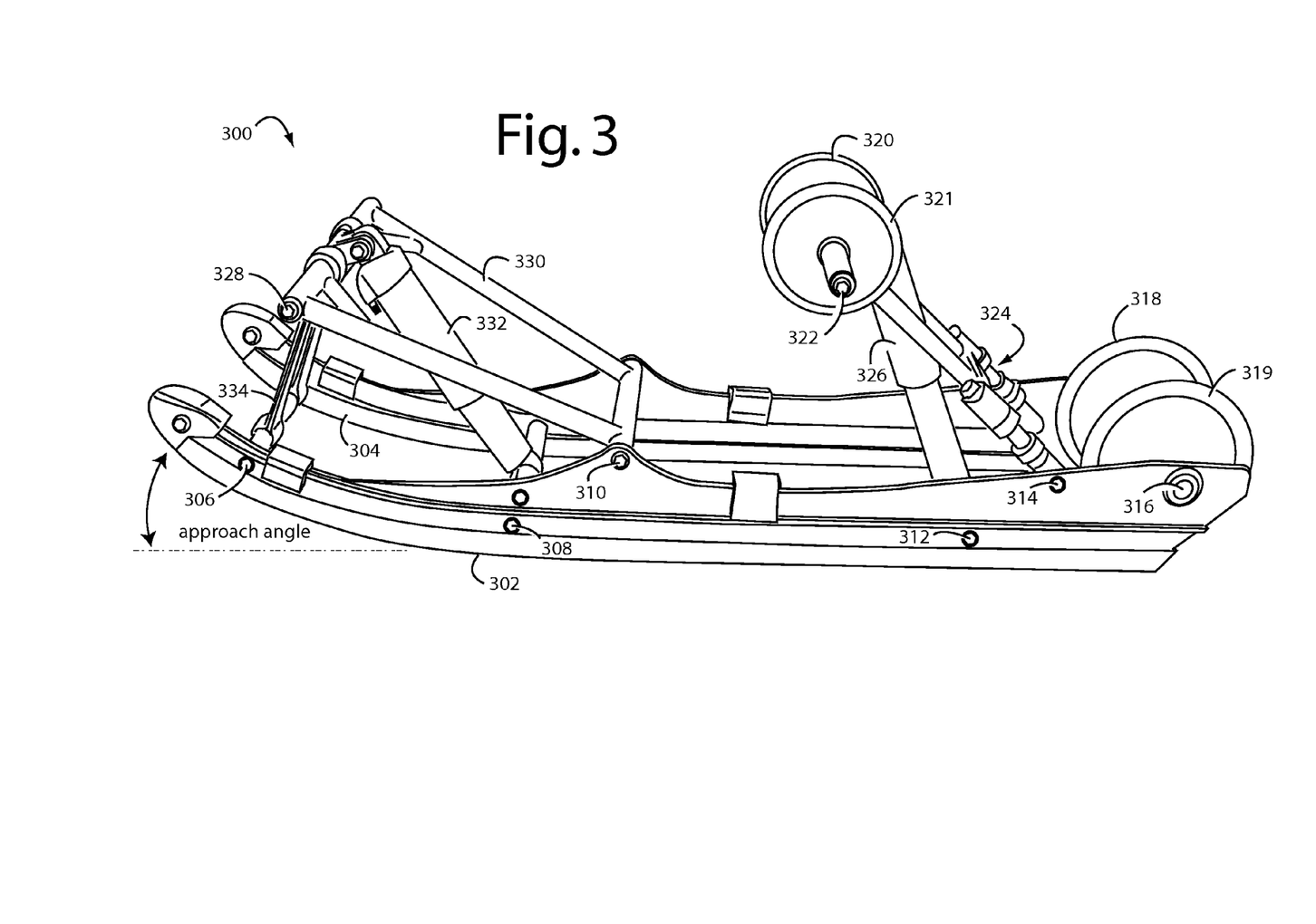
FIG. 3 is a perspective view diagram from the left side of a lower suspension assembly as is used in the snow bike of FIG. 1 and the complete rear assembly of FIG. 2.

FIG. 3 represents the lower suspension assembly 300 like that included in FIG. 2. The lower suspension assembly 300 comprises left and right sliders 302 and 304 that joined together and spaced apart by a strap shaft 306, a front shock shaft 308, a front shock shaft 310, a rear shock shaft 312, a back arm slide mechanism shaft 314, and a rear belt roller shaft 316. The track belt 220 (FIG. 2) wraps around the underside of left and right sliders 302 and 304, a pair of rear belt rollers 318 and 319, and a pair of top belt rollers 320 and 321 on a top roller shaft 322 that mounts to tunnel assembly 202 (FIG. 2).

The top end of a back arm slide mechanism 324 mounts on top roller shaft 322, as does a rear shock 326. A front mounting shaft 328 bolts inside tunnel assembly 202 (FIG. 2) and provides a strong attachment point for a front strut 330, a front shock 332, and a pair of limiter straps 334.

In one embodiment, only the top ends of limiter straps 334 were adjustable. Each had ten buckle holes in the middle of the strap and were pre-adjusted to the fifth hole down. In general, shortening the straps adds more pressure on the front ski 108 (FIG. 1) and provides better steering ski control on steep hills. Lengthening the straps lightens the ski pressure and increases the tendency of the front ski to lift when climbing. Adjusting the limiter straps 334 may also necessitate adjusting the air pressure in front shock 332 to optimize performance and rider comfort.

The front strut 330 is laid over at a high angle to allow the front of left and right sliders 302 and 304 to twist up and pivot on back arm slide mechanism shaft 314. The forward lay over angle of front strut 330 is substantially greater than that of back arm slide mechanism 324, and it is this geometry that causes the track belt to collapse under load and rear belt rollers 318 and 319 to move rearward to compensate. The track belt essentially stretches between the front drive roller and sprocket and the rear belt rollers 318 and 319 with an increased approach angle due to a lifting of the fronts of left and right sliders 302 and 304.

Figures 4, 5:
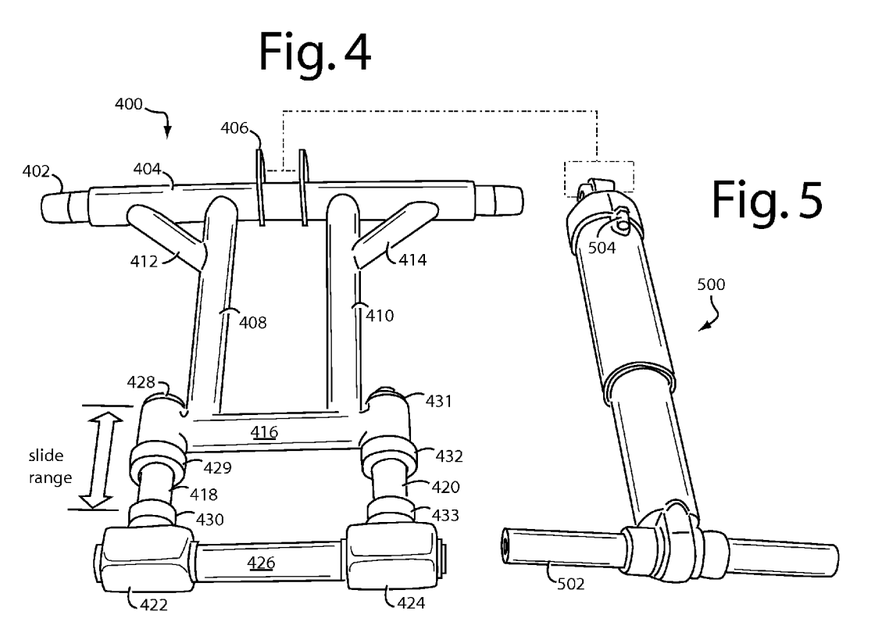
FIG. 4 is a perspective view diagram from the rear of the back arm slide mechanism and rear strut embodiment of the present invention as is used in the snow bike of FIG. 1, the complete rear assembly of FIG. 2, and the lower suspension assembly of FIG. 3.
FIG. 5 is a perspective view diagram from the rear of the rear shock as is used in the snow bike of FIG. 1, the complete rear assembly of FIG. 2, and the lower suspension assembly of FIG. 3.

FIG. 4 represents a back arm slide mechanism and rear strut embodiment of the present invention, and is referred to herein by the general reference numeral 400. The back arm slide mechanism and rear strut 400 includes a shaft 402 inside a sleeve tube 404 that provides an axle for track rollers, e.g., top track rollers 320 and 321 (FIG. 3). A shock mount 406 provides a top end mounting for a rear gas shock, e.g., shock 500 (FIG. 5). A pair of tube struts 408 and 410 are reinforced by braces 412 and 414. These are welded to a slide mechanism 416 that can ride up and down on shafts 418 and 420. These are mounted to connecting pivots 422 and 424 on an axle shaft 426. Axle shaft 426 is equivalent to back arm slide mechanism shaft 314 (FIG. 3).

Sleeve tube 404 and the rest of the slide arm mechanism attached to it below are able to rotate on shaft 402, as are connecting pivots 422 and 424 on axle shaft 426. Bridge 416, and the entire upper assembly are able to slide up and down between limits on shafts 418 and 420. The limits of extension and collapse, e.g., the slide range, are adjustable and set by stacking flat ring shims 428-433.

The normal rear ride height of snow bike 100 (FIG. 1) can be adjusted down by adding shims 428 and 431 onto the top side of the slide mechanism 416. This allows fine tuning of the seat height at rest and the amount of front ski pressure when climbing without developing excessive ski lift. The coupling of the back suspension can be tuned by changing the number of shims 429, 430, 432, 433 on the bottom side of slide mechanism 416. These control the amount of ski lift snow bike 100 will have when climbing a hill. It will also affect the mechanical independence of the front to the back portion of the suspension. Fewer shims results in less coupling, but yields more independence and ski lift. Adding shims increases coupling but reduces independence and ski lift.

FIG. 5 shows a rear gas shock 500 that connects at its top end to shock mount 406 (FIG. 4) and at its bottom end to a shaft 502, which is the same as rear shock shaft 312 (FIG. 3). A fitting 504 allows a user to adjust the air pressure inside shock 500.

Embodiments of the present invention put even pressure on the snow between the front and back portion of the suspension. This is mainly achieved by the rear arm slide mechanism and the mounting geometry of the rear shock. The slide mechanism couples the back portion of the suspension to the front at a specific spot in the range of travel. At this point the suspension will travel straight up into the tunnel, reduce the track angle, and apply the snow bike's weight toward the front, pulling it on top of the snow.

Some embodiments of the present invention include an air pump for the user to adjust the spring rate of adjustable adjustable shocks, e.g., 124, 126, 212, 214, 326, 332, and 500.

Figure 6:
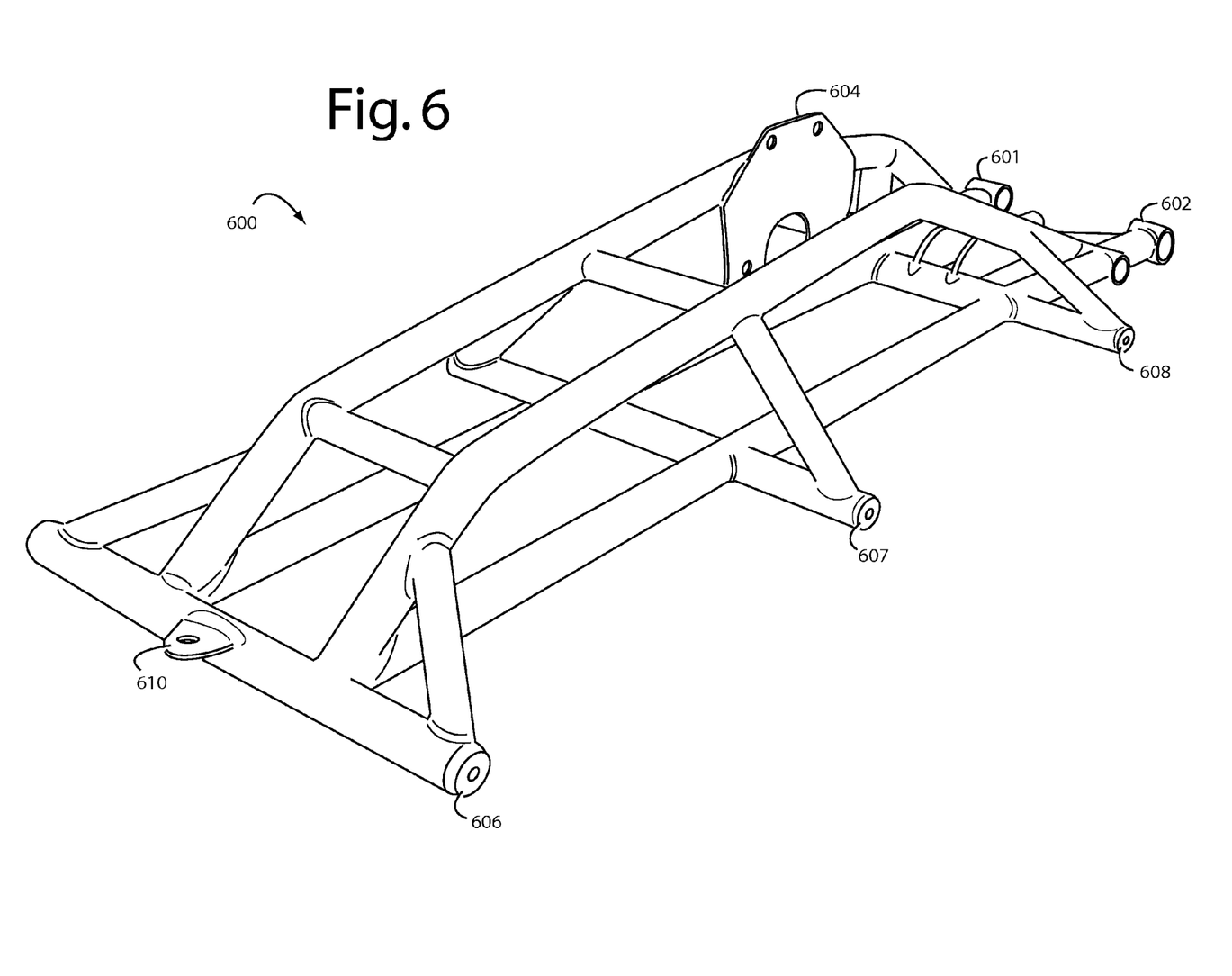
FIG. 6 is a perspective view diagram of a tubular subframe assembly in an embodiment of the present invention.

FIG. 6 represents a subframe 600 with welded steel or aluminum tubular construction that mounts to the original rear swing arm and rear shock mount locations on dirt bike 102. A solid aluminum strut-rod 114 (FIG. 1) mounts in place of the factory back shock. Subframe 600 includes all the necessary mounting points for the back suspension and drive system. A pair of mounting ends 601 and 602 are narrowly set together so that they can fit inside the rear wheel opening of dirt bike 102 and mimic the original swing arm mountings. The original swing arm pin can be inserted through them to attach subframe 600 rigidly to dirt bike 102. Subframe 600 does not swing or otherwise move once attached. A jackshaft mounting plate 604 provides support for a jackshaft and disc brake assembly. A single piece or three piece tunnel, like tunnel assembly 116 and sides 118 in FIG. 1, is attached to mounting points 606-208 and 610. The tunnel assembly provides protection for the riders' feet and a good platform on which to carry gas cans, cargo bags, and bolt-on accessories.

The suspension systems used in embodiments of the present invention do not incorporate the mono shock design included with conventional dirt bikes. A pair of front and back shocks keep pressure on the ground between the front and back ends of the track. The shocks automatically and independently adjust the track weight distribution as the suspension glides over bumps, jumps, dips, and other uneven terrain. The arrangement provides for a smooth ride and optimized traction in deep snow.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:
1. An apparatus comprising:
  a motorcycle frame supporting an engine for driving an endless track, wherein the motorcycle frame couples at a rear end to a rear suspension system;
  wherein the rear suspension system comprises:
    a subframe;

a strut disposed between the subframe and the motorcycle frame that rigidly couples the subframe with the frame, such that the subframe is substantially fixed in relation to the motorcycle frame;

a tunnel coupled with the subframe and comprising a plurality of upper rollers for supporting an upper portion of the endless track;

a shock coupling a track slide to the tunnel, wherein the track slide comprises a plurality of lower rollers for supporting a lower portion of the endless track; and wherein the track slide, the shock, the plurality of upper rollers, and the plurality of lower rollers are disposed within the endless track.

2. The apparatus of claim 1, further comprising a chain case coupled with the subframe, the chain case comprising:

a jackshaft extending outward from the sealed case and coupled to an output sprocket of the engine, via a drive chain;

an upper sprocket coupled to the jackshaft and a case chain, the case chain coupling the upper sprocket with a lower sprocket; and a driveshaft oriented parallel with the jackshaft and coupling the lower sprocket with a track drive wheel, wherein the track drive wheel is configured to engage the endless track and transfer a driving force from the engine, via the drive chain and the case chain, to the endless track.

3. The apparatus of claim 2, further comprising a disk brake coupled with the jackshaft.

4. The apparatus of claim 1, wherein the motorcycle frame couples at a front end to a front suspension system, the front suspension system comprising:

a pair of shock absorbers coupled with the motorcycle frame at upper ends of the pair of shock absorbers; and a steering ski disposed between the pair of shock absorbers at lower ends of the pair of shock absorbers.

5. The apparatus of claim 1, wherein the shock further comprises:

a front shock absorber disposed between the tunnel and the track slide for controlling the response of a front portion of the track slide to loads and acceleration; and a rear shock absorber disposed between the tunnel and the track slide for controlling the response of a rear portion of the track slide to loads and acceleration.

6. The apparatus of claim 1, wherein the rear suspension system further comprises:

a front strut pivotally coupling the track slide with the tunnel; and a rear strut pivotally coupling the track slide with the tunnel.

7. The apparatus of claim 6, wherein the rear strut further comprises an extendable portion that slides between a first position and a second position such that the length of the rear strut is adjustable by one of inserting or removing shims.

8. The apparatus of claim 6, further comprising a limiter strap having an adjustable length, the limiter strap coupling the track slide to an upper end of the front strut.

9. A system comprising:

a motorcycle frame supporting an engine for driving an endless track, wherein the motorcycle frame couples at a front end to a front suspension system, and couples at a rear end to a rear suspension system, the front suspension system comprising:

a pair of shock absorbers coupled with the motorcycle frame at upper ends of the pair of shock absorbers;

a steering ski disposed between the pair of shock absorbers at lower ends of the pair of shock absorbers; and wherein the rear suspension system comprises:

a subframe;

a strut disposed between the subframe and the motorcycle frame that rigidly couples the subframe with the motorcycle frame, such that the subframe is substantially fixed in relation to the motorcycle frame;

a tunnel coupled with the subframe and comprising a plurality of upper rollers for supporting an upper portion of the endless track;

a shock coupling a track slide to the tunnel, wherein the track slide comprises a plurality of lower rollers for supporting a lower portion of the endless track; and wherein the track slide, the shock, the plurality of upper rollers, and the plurality of lower rollers are disposed within the endless track.

10. The system of claim 9, further comprising a chain case coupled with the subframe, the chain case comprising:

a jackshaft extending outward from the sealed case and coupled to an output sprocket of the engine, via a drive chain;

an upper sprocket coupled to the jackshaft and a case chain, the case chain coupling the upper sprocket with a lower sprocket; and a driveshaft oriented parallel with the jackshaft and coupling the lower sprocket with a track drive wheel, wherein the track drive wheel is configured to engage the endless track and transfer a driving force from the engine, via the drive chain and the case chain, to the endless track.

11. The system of claim 10, further comprising a disk brake coupled with the jackshaft.

12. The system of claim 8, wherein the shock further comprises:

a front shock absorber disposed between the tunnel and the track slide for controlling the response of a front portion of the track slide to loads and acceleration; and a rear shock absorber disposed between the tunnel and the track slide for controlling the response of a rear portion of the track slide to loads and acceleration.

13. The system of claim 8, wherein the rear suspension system further comprises:

a front strut pivotally coupling the track slide with the tunnel; and a rear strut pivotally coupling the track slide with the tunnel.

14. The system of claim 13, wherein the rear strut further comprises an extendable portion that slides between a first position and a second position such that the length of the rear strut is adjustable by one of inserting or removing shims.

15. The system of claim 13, further comprising a limiter strap having an adjustable length, the limiter strap coupling the track slide to an upper end of the front strut.

16. A system comprising:

a strut disposed between a motorcycle frame and a subframe, wherein the strut rigidly couples the subframe to the motorcycle frame such that the subframe is substantially fixed in relation to the motorcycle frame;

a tunnel coupled with the subframe and comprising a plurality of upper rollers for supporting an upper portion of an endless track;

a shock coupling a track slide to the tunnel, wherein the track slide comprises a plurality of lower rollers for supporting a lower portion of the endless track; and wherein the track slide, the shock, the plurality of upper rollers, and the plurality of lower rollers are disposed within the endless track.

17. The system of claim 16, further comprising a chain case coupled with the subframe, the chain case comprising:
- a jackshaft extending outward from the chain case and coupled to an output sprocket of an engine supported by the motorcycle frame, via a drive chain;
- an upper sprocket coupled to the jackshaft and a case chain, the case chain coupling the upper sprocket with a lower sprocket; and
- a driveshaft oriented parallel with the jackshaft and coupling the lower sprocket with a track drive wheel, wherein the track drive wheel is configured to engage the endless track and transfer a driving force from the engine, via the drive chain and the case chain, to the endless track.

18. The system of claim 17, further comprising a disk brake coupled with the jackshaft.

19. The system of claim 16, wherein the shock further comprises:
- a front shock absorber disposed between the tunnel and the track slide for controlling the response of a front portion of the track slide to loads and acceleration; and
- a rear shock absorber disposed between the tunnel and the track slide for controlling the response of a rear portion of the track slide to loads and acceleration.

20. The system of claim 16, further comprising:
- a front strut pivotally coupling the track slide with the tunnel; and
- a rear strut pivotally coupling the track slide with the tunnel.

21. The system of claim 16, further comprising a limiter strap having an adjustable length, the limiter strap coupling the track slide to an upper end of the front strut.

\* \* \* \* \*